United States Patent
Levin et al.

(10) Patent No.: US 7,561,735 B2
(45) Date of Patent: Jul. 14, 2009

(54) SYSTEM AND PROCESS FOR IDENTIFYING, CHOOSING AND MATCHING COLORS

(75) Inventors: Susan Levin, Port Hueneme, CA (US); Gloria Tracy, Port Hueneme, CA (US)

(73) Assignee: K1C2, LLC, Ventura, CA (US)

( * ) Notice: Subject to any disclaimer, the term of this patent is extended or adjusted under 35 U.S.C. 154(b) by 816 days.

(21) Appl. No.: 10/728,441

(22) Filed: Dec. 5, 2003

(65) Prior Publication Data

US 2005/0135671 A1    Jun. 23, 2005

(51) Int. Cl.
G06K 9/00 (2006.01)
G09B 11/00 (2006.01)
G09B 11/10 (2006.01)
G09B 19/00 (2006.01)
G01J 3/52 (2006.01)
G09G 5/02 (2006.01)

(52) U.S. Cl. .......................... 382/162; 382/167; 434/98; 434/81; 434/84; 434/101; 434/104; 356/423; 345/600; 345/601

(58) Field of Classification Search ................ 382/162, 382/167; 434/98, 104, 101, 81, 84; 356/423; 345/601, 602
See application file for complete search history.

(56) References Cited

U.S. PATENT DOCUMENTS

| | | | | |
|---|---|---|---|---|
| 1,483,529 A * | 2/1924 | Tanner | ........................ | 434/104 |
| 2,237,165 A * | 4/1941 | Scheuer | ...................... | 434/104 |
| 2,512,181 A * | 6/1950 | Spears | ........................ | 434/104 |
| 2,521,028 A * | 9/1950 | Walker | ........................ | 434/104 |
| 4,112,594 A * | 9/1978 | Impastato | .................... | 434/104 |
| 4,399,353 A * | 8/1983 | Adkins et al. | .............. | 235/78 R |
| 4,594,070 A * | 6/1986 | Stoddard | ..................... | 434/104 |
| 4,973,253 A * | 11/1990 | Shook et al. | ................. | 434/104 |
| 6,139,325 A * | 10/2000 | Tracy et al. | ................... | 434/104 |
| 6,581,770 B1 * | 6/2003 | Gheblikian | ................. | 206/425 |
| 7,180,524 B1 * | 2/2007 | Axelrod | ...................... | 345/593 |
| 2002/0184232 A1 * | 12/2002 | Menner et al. | ........... | 707/104.1 |
| 2005/0100210 A1 * | 5/2005 | Rice et al. | .................... | 382/162 |

OTHER PUBLICATIONS

Niederst, J.—"Learning Web Design: A beginner's guide to HTML, Graphics, and Beyond"—2001—Chapter 13, O'Reilly Media Inc., http://www.learningwebdesign.com/colornames.html.*
Stacie Barnett—"Self-Service Kiosk News"—Kiosks.org—Apr. 1, 2003—XP-002322388, pp. 1-2.*
"New Tools to Help Consumers Choose Color"—Jul. 14, 2003—XP-002322389, pp. 1-3.*

* cited by examiner

*Primary Examiner*—Bhavesh M Mehta
*Assistant Examiner*—Bernard Krasnic
(74) *Attorney, Agent, or Firm*—Kelly Lowry & Kelley, LLP (57) ABSTRACT

A color matching and coordinating reference system for use by manufacturers and consumers of goods includes assigning a unique identification code for each of a plurality of colors. The identification code includes color family indicia, color value indicia, and color selector device indicia. Preferably, each color is assigned a unique color name as well. Manufacturers utilizing the system label or otherwise associate each good with the identification code for each color used therewith to assist the consumer in matching and coordinating colors. Color selector devices and tables can be used by the consumer or manufacturer in finding matching colors or coordinating/complimentary color combinations.

27 Claims, 6 Drawing Sheets

COLOR NAME CHART

| | R | R/O | O | Y/O | Y | Y/G | G | B/G | B | B/V | V | R/V |
|---|---|---|---|---|---|---|---|---|---|---|---|---|
| 1 | Ballerina | Peach | Mimosa | Nectar | Meringue | Celery | Honey Dew | Seafoam | Ice Cube | Surf | Lilac | Rosebud |
| 2 | Pink Carnation | Shrimp | Creamsicle | Honey | Lemonade | Lettuce | Spearmint | Oasis | Sky | Cerulean | Heliotrope | Rouge |
| 3 | Geranium | Coral | Cantaloupe | Marmalade | Sunshine | Lime | Kelly | Aqua | Cornflower | Morning Glory | African Violet | Rhododendron |
| 4 | Crimson | Pimento | Tangerine | Squash | Banana | New Grass | Vines | Peacock | Delft | Periwinkle | Violetta | Magenta |
| 5 | Poinsettia | Paprika | Sweet Potato | Peanut | Pineapple | Parsley | Forest | Caribbean | Sapphire | Blueprint | Mulberry | Beet |
| 6 | Ruby | Tabasco | Saddle | Gingersnap | Curry | Pine | Timberline | Lagoon | Seaport | Ocean Storm | Grape | Merlot |
| 7 | Garnet | Cinnamon | Cola | Fudge | Chutney | Army | Cypress | Baltic | Deep Sea | Midnight | Eggplant | Black Cherry |

| | T-R | T-R/O | T-O | T-Y/O | T-Y | T-Y/G | T-G | T-B/G | T-B | T-B/V | T-V | T-R/V |
|---|---|---|---|---|---|---|---|---|---|---|---|---|
| 1 | Blush | Bisque | Champagne | Ginger Ale | Cornsilk | Celadon | Menthol | Robin's Egg | Mountain Air | Snow Drop | Lavender | Teaberry |
| 2 | Primrose | Sepia | Latte | Rattan | Pear | Pistachio | Willow | Sea Mist | Foggy Morning | Periwinkle | Jacaranda | Mauve |
| 3 | Dusty Rose | Adobe | Cocoa | Butterscotch | Bamboo | Fern | Jade | Azure | Chambray | Forget-me-not | Wisteria | Terra Rosa |
| 4 | Coral Reef | Terracotta | Milk Chocolate | Peanut Butter | Mushroom | Dill | Aloe Vera | Turquoise | Wedgwood | Evening Haze | Amethyst | Bordeaux |
| 5 | Cranberry | Auburn | Maple Syrup | Crackerjax | Bronze | Olive | Zucchini | Capri | Bluebird | Iris | Plum | Raspberry |
| 6 | Burgundy | Brick | Brown Sugar | Cider | Topaz | Avocado | Ivy | Stormy Sea | Night Sky | Lupine | Smoky Concord | Maroon |
| 7 | Mahogany | Rum | Root Beer | Toffee | Ochre | Loden | Spruce | Mallard | Indigo | Blueberry | Prune | Raisin |

FIG. 7

SYSTEM AND PROCESS FOR IDENTIFYING, CHOOSING AND MATCHING COLORS

BACKGROUND OF THE INVENTION

The present invention generally relates to the selection and coordinating of colors, such as using color selector devices and the like. More particularly, the present invention relates to a system by which colors can be easily identified and the relationships to other colors can be understood even when a color selector device is not available for reference.

The human eye can see over ten million colors. The three primary colors are red, yellow and blue. The colors are called primary because they cannot be mixed from other colors. When the three primary colors are formed into a circle and each is mixed with its adjacent color, secondary colors are created. Combining red and yellow results in orange, yellow and blue results in green, and blue and red results in violet. A third tier of colors is created by mixing one primary with its adjacent secondary color resulting in yellow/green, blue/green, blue/violet, red/violet, red/orange and yellow/orange. Subsequent tiers of colos can be created by continuing to mix colors.

The sequence of colors on a color wheel isn't happenstance. It is based on the order in which color appears in the spectrum of light from the shortest wavelength to the longest. Red, orange, yellow, green, blue and violet is the sequence seen in a rainbow. When these colors are arranged into a circle, a color wheel is formed. Intermediary colors are created by combining adjacent colors as described above. Various color values (the lightness or darkness of the color) are created by adding varying amounts of white (creating a tint of the color) or black (creating a shade of the color). Toned colors are created by adding gray to the color or hue. Thus, other color wheels or color selector devices can be made for other color groups, such as "neutral" colors, "tonal" colors or even "fluorescent" colors.

Among others, color wheels are often used by artists, decorators, florists, cake decorators, painters and people involved in crafts such as quilting, needlework, beading and scrap-booking. Painters typically mix various pigments to create a needed color. Non-painters do not have the luxury of mixing colors to obtain new colors. Both painters and non-painters typically use color wheels to find aesthetically pleasing color combinations.

Pleasing combinations are possible, as well, by combining the colors found at the corners of symmetrical geometric shapes: straight line (complementary); equilateral triangle (triad); isosceles triangle (split complement); square (square tetrad) and rectangle (rectangular tetrad).

Throughout history, scientists have invented systems that explain the relationships among colors. Colors can be scientifically organized and described in various ways, but to consumers there are essentially three central issues. First, do the colors in different products or with different textures match, i.e., do they look the same placed next to each other? Second, do different colors harmonize with each other? Third, will the results of using several different combinations coordinate with each other? A common problem that consumers face is that colors identified with the same name often are different in appearance. For example, the color "sage" can have different tints, tones, or values between different manufacturers, products, etc. Thus, matching, e.g., a pillow with a comforter or couch can be a daunting task for a consumer. Sometimes, consumers will actually bring the article to be matched or coordinated into the store to compare the products side-by-side. Otherwise, the consumer must purchase the item and take it home to see if it coordinates or matches. However, even if they do this, colors may not appear consistent because of variations in artificial lighting and ambient color influences from adjacent products.

The aforementioned color selector devices (color wheels) can be used to a large extent to assist a consumer in selecting matching or coordinating colors when working on a project, decorating, etc. However, the consumer might not have the color selector device handy when shopping. Also, it is possible that the exact color to be matched may not be found on the color wheel. Thus, the consumer is often left with the daunting task of finding colors which exactly match or coordinate with one another when purchasing products. Such products can include, but are not limited to, sewing, quilting, scrap-booking, general crafting, and interior decorating. Accordingly, there is a continuing need for a color identification system to assist consumers in finding exact matching colors between products and which can also assist the consumer in finding coordinating color combinations. The present invention fulfills these needs and provides other related advantages.

SUMMARY OF THE INVENTION

The present invention resides in a method for creating a color matching and coordinating reference system which can be used by both manufacturers and consumers of goods to create consistency of color labeling amongst products and to assist consumers in obtaining exact color matches and harmonious color combinations. Generally, a unique identification code is assigned for each of a plurality of colors. The identification code comprises color family indicia and color value indicia. Color family indicia may be selected from red, red/orange, orange, yellow/orange, yellow, yellow/green, green, blue/green, blue, blue/violet, violet and red/violet. The color value indicia is typically a number between 0 and 8.

Means, typically a color selector device, is used to determine coordinating color combinations, and thus the color identification codes for these colors. The identification code preferably also comprises a color selector device indicia representing the color selector device from which the color, or a close proximity thereto, can be found. Typically, the unique identification code for each color is associated with each color displayed on the color selector device. Color selector devices used in accordance with the present invention include a basic true value selector device, a tonal color selector device, and a neutral color selector device.

In a particularly preferred embodiment of the present invention, each color of the plurality of colors is also assigned a unique color name. This enables a manufacturer or consumer to refer to a particular color used in the system of the present invention by name in addition to, or rather, than the identification code. A table can be used to cross-reference matching and coordinating colors. The table lists at least a portion of the plurality of colors according to each color's identification code and assigned color name.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 7 is an exemplary table listing colors by assigned color name and identification code in accordance with the present invention.

DETAILED DESCRIPTION OF THE PREFERRED EMBODIMENTS

As illustrated in the accompanying drawings, the present invention resides in a method for creating a color matching and coordinating reference system for use by both manufacturers and consumers of goods of the manufacturers. As described above, there remains a persistent problem in matching and coordinating colors when purchasing goods. Color names are not used consistently between manufacturers or between different types of goods. Thus, two paint manufacturers may both have paints called "marigold" but each product may appear to be very different. Conversely, two manufacturers may have the same paint color and call them by two different names. This causes much frustration on the part of the consumer who is trying to match exactly or find coordinating pieces. The consumer is left to physically bring a sample to the store or home to match or determine the harmonious combination which may not even help based on the lighting conditions and the ambient colors from adjacent products. Alternatively, sophisticated purchasers might bring a color selector device during shopping trips.

The present invention is intended to provide a system which consistently identifies colors and color relationships. The invention imposes order and regularity on combining colors in commonly used products. Using the present invention, consumers can be confident that even if they lack the visual training or sensitivity to see all of the subtle color variations visible to the human eye, they will still have a completed project, whether it is as big as an entire house or as small as a bookmark, that is harmonious and color-coordinated. The present invention also assures visual continuity even when no color selector is available for a color check. The present invention enables consumers to find exact matching color pieces and also assures consumers that their color choices will be harmonious and coordinated regardless of what products are used to complete a project.

Figures 1, 2:
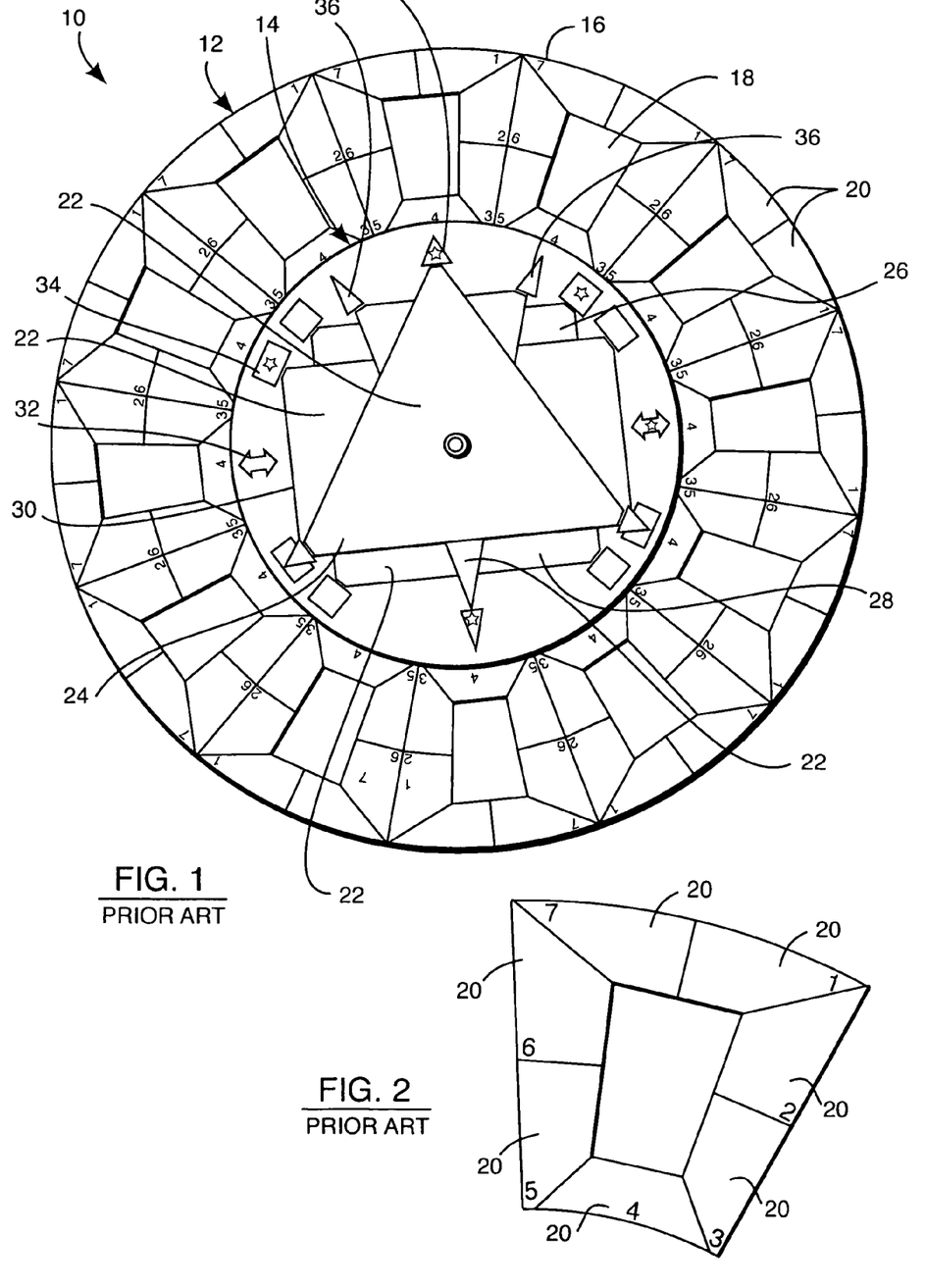
FIG. 1 is a top plan view of a color selector device used in accordance with the present invention.
FIG. 2 is an enlarged view of one selection group located at the periphery of the color selector device of FIG. 1.
Figure 3:
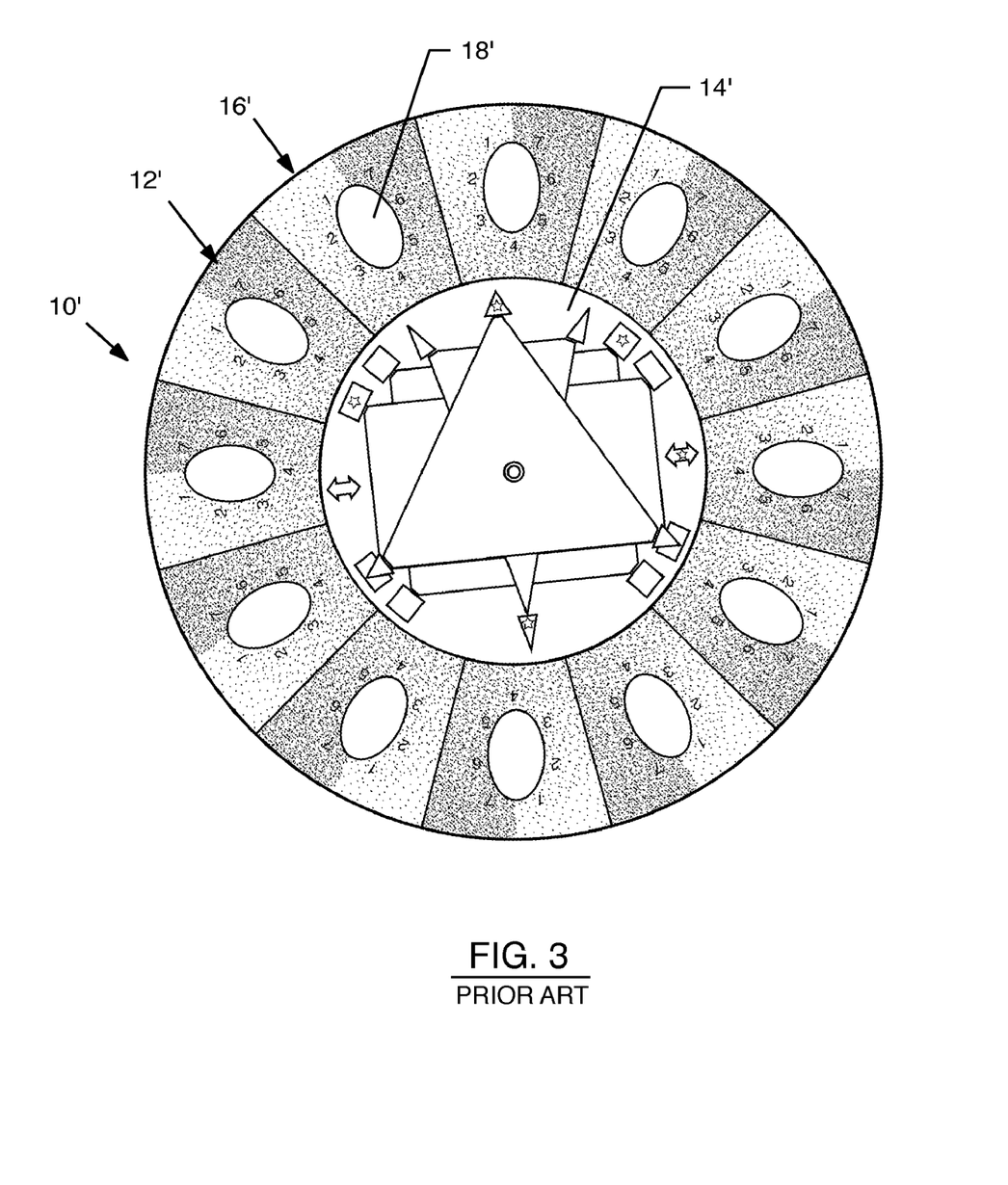
FIG. 3 is a top plan view of another color selector device which can be used in accordance with the present invention.

With reference now to FIGS. 1-3, specially designed color selector devices 10 and 10' are provided to manufacturers and end-user consumers of goods. With particular reference to FIGS. 1 and 2, a color selector device 10 is illustrated which was designed by the inventors of the present application and previously assigned U.S. Pat. No. 6,139,325, the contents of which are hereby incorporated by reference. The device 10 is generally comprised of a base 12 and a color selector wheel 14 rotatably attached to the base 12. The base 12 includes a plurality of distinct color selected groups 16 disposed beyond and surrounding the peripheral edges of the color selection wheel 14.

The color selector device 10 displays twelve color families, one family in each group 16. The color families are placed in an order that is based on their position in the light spectrum. Typically, the twelve colors used are hues of the third tier of color. Color is a general term for what an individual sees when light falls on an object, including black, white and gray. Hue is sometimes used interchangeably with color but actually applies only to pure color. In a "true" hue color wheel, the configuration of the colors starting at red and traveling clockwise are: red/orange, orange, yellow/orange, yellow, yellow/green, green, blue/green, blue, blue/violet, violet, and red/violet. It will be appreciated by those skilled in the art that the number of color selection groups 16 can be reduced or increased as needed. Due to the science of color theory, the number of sections preferably represent the tiers of color, namely, three, six, twelve, twenty-four, etc.

Preferably, cut-out windows 18 are formed in each color selection group 16 to facilitate the comparison and matching of samples to the color and value in the selection group 16. Value is the lightness or darkness of the color, that is the shade of the color which is darkened by adding black or the tint of the color which is lightened by adding white. As is more easily seen in FIG. 2, the selection groups 16 are each divided into smaller sub-sections 20, each of which has a predetermined color value. One of the values will represent the hue or true color and the remaining values are the lightness or darkness of the hue as measured against a gray scale that runs from white to black. For example, adding white to red produces pink, a tint of red. Navy, for example, is a shade of blue. Addition of gray of the same value as the color creates tones. In a particularly preferred embodiment, seven sub-sections 20 are provided, each sub-section 20 representing a tint or shade (i.e. color value) of the hue. For example, the true color or hue can be represented with the color sub-section having the assigned value of "4" with the "1" and "7" representing the lightest tint or darkest shade of the hue.

As more fully described in the '325 patent, the color selector wheel 14 includes color selection indicia in the form of geometrical symbols 22 (such as an equilateral triangle 24, rectangle 30, and opposing arrows 32) which include an identifying mark 34 on a vertex and which can be used to provide harmonious color combinations. When choosing a combination based on an existing piece, such as fabric, fiber, paint chip, or other sample, the user places the existing sample under the cut-out windows 18 of the base 12 and moves the sample from window to window until the closest color and value match is found. The color selection group 16 and the value number sub-section 20 are noted. The user then decides whether he or she prefers a 2, 3 or 4 color combination and uses the appropriate geometrical symbol 22, 26, 28 or 30 on the color selector wheel 14. The marked primary vertex 14 of the geometric symbol 22, 26, 28 or 30 is aligned and pointed to the selection group 16 having the selected color value and the secondary vertices 36 of the geometric symbol 22 are automatically aligned with and point to corresponding color selector groups 16 which form harmonious, balanced color combinations. As described in the '325 patent, progressive color combinations of coordinating colors can be determined as well.

The color wheel illustrated in FIGS. 1 and 2 can not only apply to a true value color scale, but also a neutral color scale, wherein colors with little visible hue or achromatic colors are displayed. FIG. 3 illustrates a color selector device 10' having similar structure and features as that described above. However, the color selector device 10' represents a tonal color scale, that is colors changed by adding gray. The true value, neutral and tonal color scales, as well as other possible color scales, i.e., color scale indicia, are identified and represented on different color selector devices 10'. Providing the user of the present invention with a true color selector device, neutral color selector device and tonal color selector device each with 12 color families divided into 7 color value sub-sections provides the end user 252 commonly used "colors" which are used in commerce. Of course, additional color selector devices may be provided, such as one based on fluorescent colors, or the number of color families and/or color value sub-sections can be increased to increase the number of colors available through the color selector devices 10 provided to the end user for direct comparison purposes. Literature, such as tables of colors used in accordance with the present invention can also be provided along with the color selector devices 10, as will be described more fully herein.

A problem encountered by consumers utilizing the types of color selector devices described above is that even when exactly matching a color on the color selector device with the particular piece in question and finding the desired color combinations, the user is required to bring the color selector device to the store to find the exact matching pieces or coordinating color pieces. This required that the user hold the color selector device up to the piece to be purchased to ensure an exact or coordinating match. However, as described above, even if they do this, colors may not appear consistent because of variations in artificial lighting and ambient color influences from adjacent products. Of course, this is inconvenient to the end user who does not always have a color selector device on his or her person while shopping. Moreover, in some instances, the piece to be purchased was not physically present but had to be ordered. In this case, the end user consumer was left hoping that the color would in fact match or coordinate based on the product and color description.

Creating products with harmonious color combinations has also been a difficult task for manufacturers. The manufacturer must then also assign a color name to the product to assist the end user consumer in determining the color thereof. Of course, not all manufacturers utilize the same naming schemes.

Figure 4:
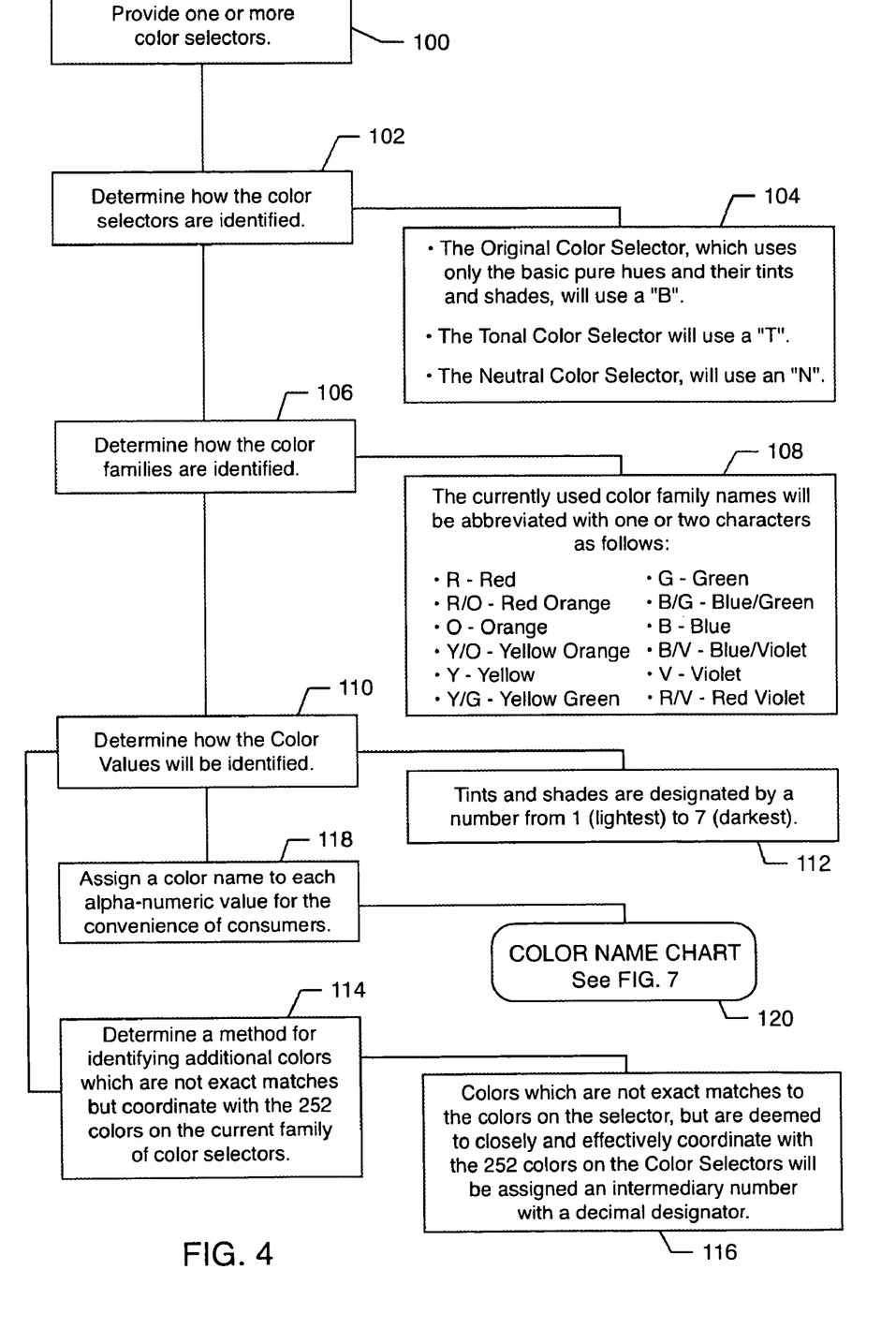
FIG. 4 is a flow chart depicting the steps taken in establishing the system of the present invention.

With reference now to FIG. 4, the present invention utilizes one or more color selector devices and a naming and identification system which is used by manufacturers to the benefit of both the manufacturers and the end user consumers. Colors are consistently named and given an identification code that corresponds with the placement of the color on a given color selector wheel. In this manner, an end user consumer can request a good from a manufacturer by the assigned name or by the identification code and be assured that the color is exactly that which the consumer desires without having to physically compare a color wheel against the object to be purchased.

First, as shown in FIG. 4, one or more color selector devices are provided (100) to the manufacturers and end user consumers utilizing the system of the present invention. It is then determined how the color selector devices are identified (102). For example, the original color selector device 10, illustrated in FIGS. 1 and 2 uses the pure basic hues and their tints and shades. This can be given a single letter abbreviation such as a "B". The tonal color selector device can be assigned the letter "T", and the neutral color selector device can be assigned the letter "N" (104).

It is then determined how the color families are identified (106). In a particularly preferred embodiment, the currently used color families are abbreviated with one or two characters. For example, "R" is used for red, "R/O" for red/orange, "O" for orange, "Y/O" for yellow/orange, "Y" for yellow, "Y/G" for yellow/green, "G" for green, "B/G" for blue/green, "B" for blue, "B/V" for blue/violet, "V" for violet, and "R/V" for red/violet (108).

It is then determined how the color values will be identified (110). In its preferred embodiment, the present invention uses one or more color selector devices such as those described above wherein the values are designated by a number from 1 (lightest) to 7 (darkest) (112). Thus, each tint or shade of the color within the color family group would be identified with a numeral. Thus, for the basic pure hue of red, the identification code would consist of "B-R4", corresponding to the pure hue color selector device "B", the family color group red "R", and the pure hue color value "4". The identification codes for each color on a given color selector device can be printed on the color selector device, such as on a back face of the base 12 or in literature accompanying the color selector device. Of course, this is only an exemplary and preferred labeling scheme. It will be appreciated by those skilled in the art that other labeling schemes can be created to accomplish the same purpose, namely, providing an identification code corresponding to a given color for reference purposes.

As mentioned above, the human eye can detect over ten million colors. There are thousands of colors which are used in printing, dying, etc. goods made by manufacturers. Thus, it is possible that an end user of the present invention could find a product having a color which does not exactly match any color value of the provided color selector devices. In such instance, the present invention contemplates determining a method for identifying additional colors which are not exact matches but coordinate with the two-hundred and fifty-two colors on the current family of color selectors (114). For example, colors which are not exact matches to the colors on the color selector device, but are deemed to closely and effectively coordinate with the two-hundred and fifty-two colors on the provided color selector devices can be assigned an intermediary number with a decimal designator (116). For example, a product may have a color which has a tint between 2 and 3. This color could be assigned the color value number 2.5. Thus, colors could be assigned a color value of between 0.1 and 7.9 and correlate with the above-described color selector devices. Using the pure color, tonal, and neutral color selector devices and this decimal system would enable the identification of thousands of different colors.

A color name is preferably assigned to each alpha-numeric value for the convenience of both consumers and manufacturers (118). These color names can be provided in association with the color selector devices, such as by printing these names on the color selector device or providing literature in association with the color selection devices. In a particularly preferred embodiment of the invention, the colors are listed in a color name chart (120). Such a color name chart is illustrated in FIG. 7 and includes assigned names for each color family and color value color displayed on the basic pure hue color selector and the tonal color selector devices. Each color name will be unique to that particular color. The color name, and identification code, would be established by an entity administering the present invention to create consistency. Guidelines for naming the colors could include avoiding light, dark, pale, etc. (e.g. pale moss and dark moss). The color family name would also be avoided, e.g. real red or captivating green. Fanciful names are also avoided as they must imply the general color family (i.e. enigma or lollipop). Variations of the same word are also avoided (i.e. mature grape, grape harvest and gorgeous grape). Lastly, such naming of colors should avoid flowers or other objects that come in multiple colors, i.e. pansy or quartz. In the illustrated color name chart of FIG. 7, the pure hue for red R4 is assigned the name "crimson" which corresponds with the red family group of the pure basic hue color selector device having a color value of "4". The corresponding color in the tonal color selector device is labeled "coral reef".

Figure 5:
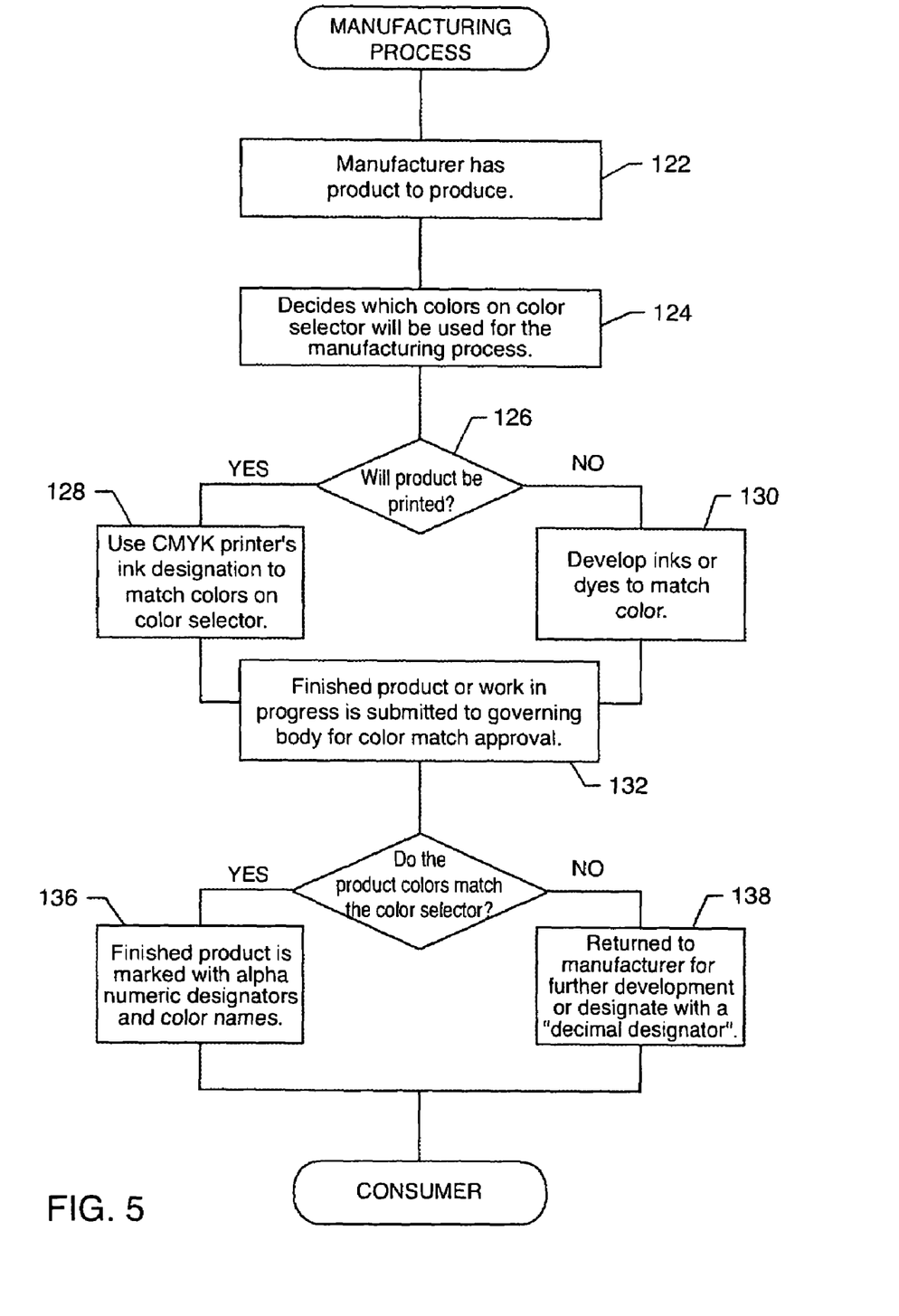
FIG. 5 is a flow chart depicting the steps taken during a manufacturing process of goods in accordance with the present invention.

The present invention is used in cooperation with manufacturers of goods, as illustrated in FIG. 5. The manufacturer has a product to produce (122). The manufacturer decides which colors on a given color selector device will be used for the manufacturing process of the product (124). It is then determined whether the product will be printed (126). If it is, the manufacturer uses the CMYK (cyan, magenta, yellow, black) printer's ink designation to match colors on the color selector device (128). If not, inks or dyes are developed to match the color (130).

The colors used in producing the product must match the colors on the color selector devices provided in accordance with the system of the present invention or match one of the numeric decimal designators. Accordingly, the finished product or work in progress is submitted for color match approval (132) to the governing body or implementor of the system of the present invention to determine that in fact the colors exactly match those having an identification code and assigned name, as described above. The implementor or governing body of the present invention then determines whether the product colors match the colors displayed on the color selector (134). If so, the finished product is marked with the alpha-numeric identification code designators and assigned a color name (136). If not, the product is returned to the manufacturer for further development, or designated with a "decimal designator" (138). Such identification codes incorporating the "decimal designator" may or may not have an assigned name, but the finished product will still be labeled with the complete identification code, including the decimal color value designator. Preferably, the product or product packaging is labeled with such identification codes and an approved logo or the like to indicate that this manufacturer utilizes the system of the present invention.

Figure 6:
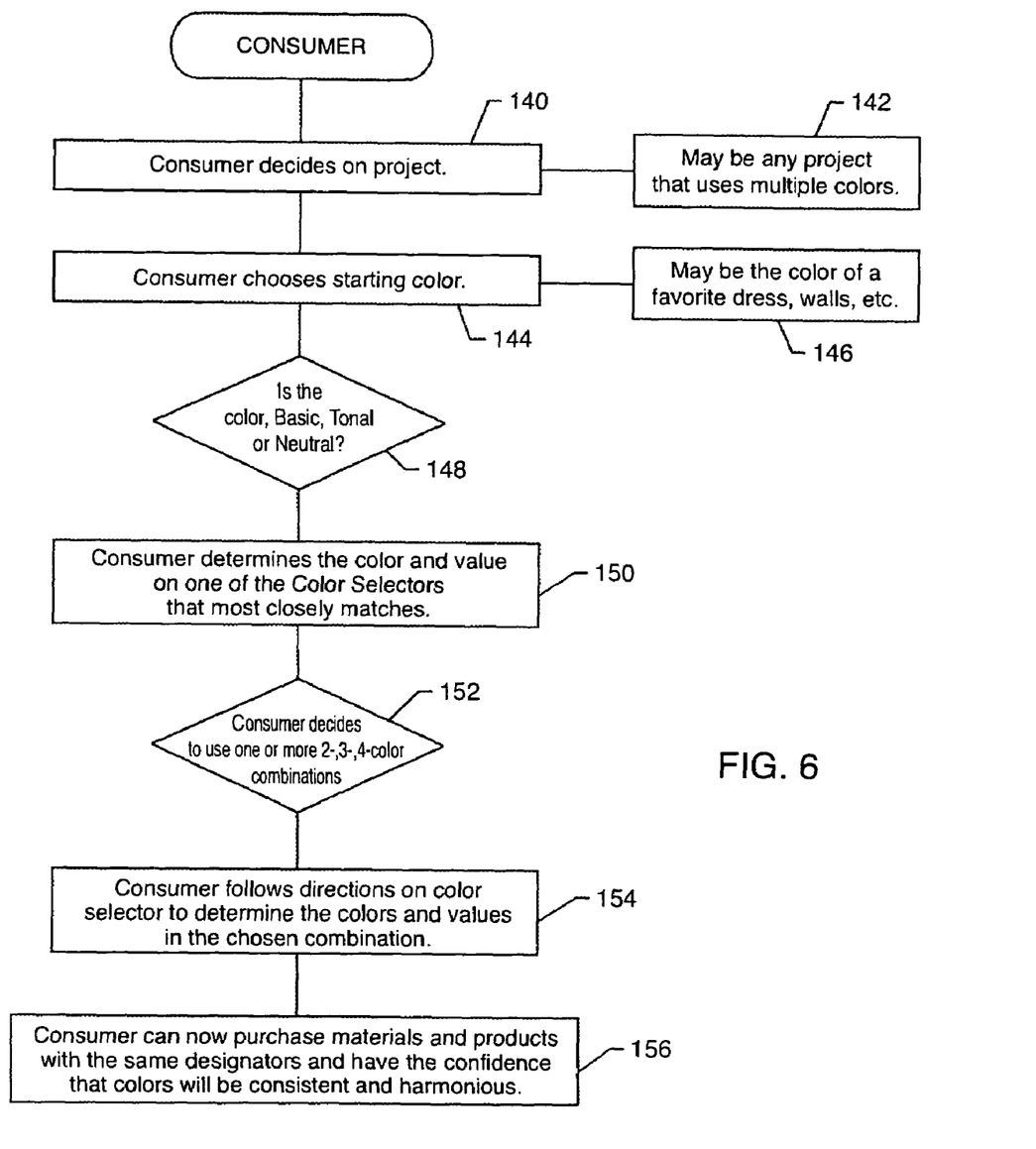
FIG. 6 is a flow chart depicting the steps taken by an end user consumer of the present invention.

With reference now to FIG. 6, consumers can be assisted in making exact color matches and coordinating color combinations in their various projects by purchasing products labeled with the identification codes and/or assigned names which are produced by manufacturers utilizing the system of the present invention. The consumer first decides on a project (140). Typically, the project involves multiple colors (142). The consumer then chooses a starting color (144), which may be the color of a favorite dress, wall, etc. (146). For example, the end user consumer might be interested in purchasing shoes which would exactly match or coordinate with the dress; or purchase a piece of furniture which would coordinate or match with the flooring or wall coloring. Of course, the scope of the invention is not limited to such as consumers could use the invention in purchasing scrap-booking materials, paint, etc.

The consumer then determines whether the color is basic, tonal, neutral or otherwise associated with a color selector device (148). Using the proper color selector device, the consumer determines the color and value that most closely matches the starting color (150). The consumer then decides to use an exact match, or one or more 2, 3, 4 color combinations (152). The consumer follows the directions on the color selector device to determine the colors and values in the chosen combination (154), as described above.

Using the information provided by the color selector device, the consumer can purchase materials and products with the same identification code or designators and have the confidence that the colors will be consistent and harmonious (156). For example, if a seat cushion on a leather couch were to tear or otherwise need replacement, the consumer could reference the labeling on the couch to determine the assigned color name or unique identification code of the color of leather used, or utilize a color selector device incorporating the present invention to determine the same information. The consumer could then contact the company to order an exact replacement to ensure that the color exactly matches. In some instances, the color that was originally produced and used becomes faded over time due to sunlight exposure, etc. The consumer could use a color selector device to determine the identity of the now faded color to arrange for patchwork, replacement, etc. which would match the now faded piece.

It will be readily appreciate by those skilled in the art that the present invention provides a color coordinating and identification system which brings consistency in labeling between manufactured goods for easy identification by the end user consumer. The end user consumer can reference a color selector device or table or the like to determine an identification code or assigned name of one or more desired colors and armed with this information enter retail stores or approach retail establishments by phone, Internet, etc. and request products having the exact matching color or coordinating colors using the system of the present invention to ensure that the end product would in fact have the desired colors. Manufacturers of clothes could request certain colors of fabrics from fabric manufacturers to ensure consistency in ordering and in product clothing.

Although several embodiments of the present invention have been described in detail for purposes of illustration, various modifications of each may be made without departing from the spirit and scope of the invention. Accordingly, the invention is not to be limited, except as by the appended claims.

What is claimed is:

1. A method for creating a color matching and coordinating reference system for use by manufacturers and consumers of products, comprising the steps of:

establishing a governing body;

a first manufacturer submitting a first product or product sample having at least one color to the governing body to be assigned an identification code corresponding to the at least one color of the first product or product sample, and to obtain approval to use the governing body's one or more assigned identification codes in association with the first product;

the governing body assigning an identification code for each color of the first manufacturer's product or product sample, and granting approval to the first manufacturer to use the one or more assigned identification codes in association with the product;

a second manufacturer submitting a second product or product sample of a different type than the first product and having at least one color to the governing body to be assigned an identification code corresponding to the at least one color of the second product or product sample, and to obtain approval to use the governing body's one or more assigned identification codes in association with the second product;

the governing body assigning an identification code for each color of the second manufacturer's product or product sample, and granting approval to the second manufacturer to use the one or more assigned identification codes in association with the second product;

the first manufacturer labeling the one or more assigned identification codes with the first manufactured product;

the second manufacturer labeling the one or more assigned identification codes with the second manufactured product; and consumers of the first and second manufacturers' products utilizing the one or more identification codes to match and coordinate colors of the first and second products.

2. The method of claim 1, including the step of assigning a unique color name to each identification code.

3. The method of claim 2, including the step of cross-referencing matching and coordinating colors using a table listing at least a portion of the plurality of colors according to each color's identification code or assigned color name.

4. The method of claim 1, wherein the assigning a unique identification code step includes the step of assigning an alpha-numeric identification comprising indicia for a color classification, the color family, and the color value.

5. The method of claim 4, wherein the color family indicia is selected from a list consisting of: red, red/orange, orange, yellow/orange, yellow, yellow/green, green, blue/green, blue, blue/violet, violet, and red/violet.

6. The method of claim 4, wherein the color value indicia is a number.

7. The method of claim 6, wherein the color value indicia for each color of the plurality of colors is between 0 and 8.

8. The method of claim 4, wherein the identification code for each color classification comprises a color selector device indicia corresponding to a color selector device which displays that color.

9. The method of claim 8, including the step of the governing body providing a plurality of color selector devices, each color selector device displaying a plurality of colors, and each color labeled with a pre-assigned identification code including indicia representing the color selector device or color classification, the color family, and the color value, wherein consumers can match or coordinate colors of products not using identification codes assigned by the governing body with the first or second products having identification codes assigned by the governing body.

10. The method of claim 1, including the step of the first and second manufacturers further labeling indicia with the first and second products representing that the governing body has assigned and approved the one or more identification codes corresponding to the one or more colors of the first and second products.

11. The method of claim 1, including the steps of the governing body pre-assigning an identification code to each of a plurality of colors, and comparing and matching the one or more colors of the first and second products or product samples submitted by the first and second manufacturers to the plurality of colors and assigning the one or more colors of the first and second products or product samples a pre-assigned identification code corresponding to the matching color of the plurality of colors.

12. The method of claim 1, wherein the labeling step includes the step of attaching a label including the one or more identification codes assigned to the one or more colors of the product to the product or product packaging so as to be referenced by a consumer of the product.

13. A method for creating a color matching and coordinating reference system for use by manufacturers and consumers of products, comprising the steps of:

establishing a governing body;

the governing body pre-assigning an identification code and a corresponding name to each of a plurality of colors, wherein the identification code comprises an alpha-numeric identification including indicia for a color classification, a color family, and a color value;

a first manufacturer submitting a first product or product sample having at least one color to the governing body to be assigned an identification code corresponding to the at least one color of the first product or product sample, and to obtain approval to use the governing body's one or more assigned identification codes in association with the first product;

a second manufacturer submitting a second product or product sample of a different type than the first product and having at least one color to the governing body to be assigned an identification code corresponding to the at least one color of the second product or product sample, and to obtain approval to use the governing body's one or more assigned identification codes in association with the second product;

the governing body comparing and matching the one or more colors of the first and second products or product samples submitted by the first and second manufacturers to the plurality of colors and assigning each of the one or more colors of the first and second products or product samples a pre-assigned identification code corresponding to the matching color of the plurality of colors;

the governing body granting approval to the first and second manufacturers to use the one or more identification codes or names in association with the first and second products;

the first and second manufacturers labeling the assigned one or more color names or identification codes with the manufactured first and second products; and consumers of the first and second manufacturers' products utilizing the assigned one or more color names or identification codes to match and coordinate colors of the first and second products.

14. The method of claim 13, wherein the color family indicia is selected from a list consisting of: red, red/orange, orange, yellow/orange, yellow, yellow/green, green, blue/green, blue, blue/violet, violet, and red/violet.

15. The method of claim 14, wherein the color value indicia is a number.

16. The method of claim 15, wherein the color value indicia for each color of the plurality of colors is a number between 0 and 8.

17. The method of claim 13, wherein the identification code for each color classification comprises a color selector device indicia corresponding to a color selector device which displays that color.

18. The method of claim 17, including the step of the governing body providing a plurality of color selector devices, each color selector device displaying a plurality of colors, and each color labeled with a pre-assigned identification code including indicia representing the color selector device or color classification, the color family, and the color value, wherein consumers can match or coordinate colors of products not using identification codes assigned by the governing body with the first and second products having the identification codes assigned by the governing body.

19. The method of claim 13, including the step of cross-referencing matching and coordinating colors using a table listing at least a portion of the plurality of colors according to each color's identification code or assigned color name.

20. The method of claim 13, including the step of the first and second manufacturers further labeling indicia with the first and second products representing that the governing body has assigned and approved the one or more identification code corresponding to the one or more colors of the first and second products.

21. The method of claim 13, wherein the labeling step includes the step of attaching a label to the first and second products or product packaging including the one or more identification codes assigned to the one or more colors of the first and second products so as to be referenced by a consumer of the first and second products.

22. A method for creating a color matching and coordinating reference system for use by manufacturers and consumers of products, comprising the steps of:

establishing a governing body;

the governing body pre-assigning an identification code and a corresponding name to each of a plurality of colors, wherein the identification code comprises an alphanumeric identification including indicia for a color classification, a color family, and a color value;

a first manufacturer submitting a first product or product sample having at least one color to the governing body to be assigned an identification code corresponding to the at least one color of the first product or product sample, and to obtain approval to use the governing body's one or more assigned identification codes in association with the first product;

a second manufacturer submitting a second product or product sample of a different type than the first product and having at least one color to the governing body to be assigned an identification code corresponding to the at least one color of the second product or product sample, and to obtain approval to use the governing body's one or more assigned identification codes in association with the second product;

the governing body comparing and matching the one or more colors of the first and second products or product samples submitted by the first and second manufacturers to the plurality of colors and assigning each of the one or more colors of the first and second products or product samples a pre-assigned identification code corresponding to the matching color of the plurality of colors;

the governing body granting approval to the first and second manufacturers to use the one or more identification codes or names in association with the first and second products;

the first and second manufacturers attaching a label to the first and second products or product packaging, the label including the assigned one or more color names or identification codes corresponding with the one or more colors of the manufactured first and second products, and indicia representing that the one or more color names or identification codes on the label has been approved by the governing body;

consumers of the first and second manufacturers' first and second products utilizing the one or more color names or the identification codes to match and coordinate colors of the first and second products; and the governing body providing a plurality of color selector devices, each color selector device displaying a plurality of colors, and each color labeled with a pre-assigned identification code including indicia representing the color selector device or color classification, the color family, and the color value, wherein consumers can match or coordinate colors of products not using identification codes assigned by the governing body with the first or second product having identification codes assigned by the governing body.

23. The method of claim 22, wherein the color family indicia is selected from a list consisting of: red, red/orange, orange, yellow/orange, yellow, yellow/green, green, blue/green, blue, blue/violet, violet, and red/violet.

24. The method of claim 22, wherein the color value indicia is a number.

25. The method of claim 24, wherein the color value indicia for each color of the plurality of colors is a number between 0 and 8.

26. The method of claim 22, wherein the identification code for each color classification comprises a color selector device indicia corresponding to a color selector device which displays that color.

27. The method of claim 22, including the step of cross-referencing matching and coordinating colors using a table listing at least a portion of the plurality of colors according to each color's identification code or assigned color name.

* * * * *